United States Patent Office 2,816,817
Patented Dec. 17, 1957

2,816,817

PROCESS FOR THE PRODUCTION OF TITANIUM DICHLORIDE AND ZIRCONIUM DICHLORIDE

Eberhard Stein, Leverkusen, Hans-Ferdinand Rickert, Koln-Stammheim, and Gustav Pieper, Leverkusen, Germany, assignors to Farbenfabriken Bayer Aktiengesellschaft, Leverkusen, Germany, a corporation of Germany No Drawing. Application September 20, 1955, Serial No. 535,512

Claims priority, application Germany September 21, 1954

4 Claims. (Cl. 23—87)

The invention relates to a process for the production of titanium dichloride and zirconium dichloride.

It is known that titanium dichloride and zirconium dichloride can be obtained at high temperature by thermal decomposition of titanium or zirconium trichloride or by reaction of titanium with titanium tetrachloride (Zeitschrift für Anorganische Chemie, 249 (1942), page 199). However, these processes have the important disadvantage that they require very long reaction times and are only successful when the operation is carried out very carefully. They have consequently not been used technically.

It is also known that titanium dichloride is formed by reduction of titanium tetrachloride with sodium amalgam (Liebigs Annalen d. Chemie, 237 (1887), page 217). This method has hitherto also not been of any importance, since it involves using an absolutely dry amalgam and cannot be carried out with the amalgam originating from alkali electrolysis. Apart from this fact, such a process is seriously encumbered by large amounts of entrained mercury.

The reduction of titanium tetrachloride has also already been effected with potassium by initially melting the potassium under toluene, finely dispersing the potassium in the latter by shaking and then reacting with titanium tetrachloride dissolved in toluene or xylene (Zeitschrift für Anorganische Chemie 81 (1913), pages 364–368). Titanium metal and a lower titanium chloride not described in detail were obtained with this process. A subsequent thorough investigation showed that the chloride in question was titanium trichloride (Zeitschrift für Anorganische und Allgemeine Chemie 128 (1923), pages 81–95). In any case, metallic titanium was formed in this reaction of titanium tetrachloride with alkali metal, as is also the case at high temperature under pressure (Journal of the American Chemical Society 32 (1910), pages 330–336).

For certain uses and particularly for use as a polymerisation catalyst, the titanium dichloride should, however, be free from metallic titanium, because the latter cannot be dissolved out of the polymer. On the other hand, since the titanium trichloride has a nuisance value since it occupies space and yet is catalytically inactive, in the same way as the alkali metal chloride which is unavoidable when reducing with an alkali metal, there is a demand for a manufacturing process for a titanium dichloride, and also for a zirconium dichloride, which is free from insoluble metal and has a low content of the higher valency chloride.

In accordance with the invention it has now been found that titanium dichloride and zirconium dichloride which are fully satisfactory in the sense set forth above can be obtained within short reaction times by reacting titanium tetrachloride or trichloride, or zirconium tetrachloride or trichloride, within specified narrow temperature ranges with sodium metal in a dispersion of about 7 microns particle size. These temperature ranges depend on the starting materials and are between 95 and 120° C. for the titanium chlorides and between 130 and 160° C. for the zirconium chlorides. If the reaction temperature remains below the upper limit indicated above, the reaction product does not contain any important amount of trichloride.

Accordingly the present invention provides a process for the production of finely divided titanium or zirconium dichloride free from metallic titanium or zirconium by reduction of a higher titanium or zirconium chloride by means of sodium metal dispersed in a suitable liquid, wherein the particle sizes of the sodium in the dispersion are between 5 and 10 microns and the sodium is reacted with the higher chloride at a temperature which is between 95 and 120° C. in the case of a titanium chloride or between 130 and 160° C. in the case of a zirconium chloride.

If the temperature drops below the lower limit indicated, the sodium reacts at a speed which is technically acceptable only if it is alloyed with potassium.

The process of the present invention can, for example be carried out by initially preparing a sodium dispersion at about 100° C. in an inert diluent, such as toluene, commercial benzine, paraffin oil or hard paraffin, using a high-speed intensive stirrer. With the very effective stirrer mechanisms which are available as a result of recent developments in the art, it is possible for the alkali metal melt to be reduced to a relatively uniform particle size of aproximately 7 microns. The amount of trichloride or tetrachloride necessary for the formation of the titanium or zirconium dichloride is then introduced with powerful stirring at the temperatures indicated above into the dispersion thus obtained, provision being made by external cooling to prevent the temperature from rising too high.

The reaction is practically complete after the introduction of the chloride to be reduced, this being spread over ½ to 2 hours to enable the correct temperature to be maintained, and a deep black titanium or zirconium dichloride suspension is obtained. After separation of the diluent, titanium or zirconium dichloride can be isolated from the suspension as a black powder, the said dichloride still containing sodium chloride.

It is not essential to proceed as described above. The sodium dispersion can also be run into a prepared solution of titanium tetrachloride or a suspension of titanium or zirconium trichloride or zirconium tetrachloride, or it is even possible for both reactants to be introduced simultaneously into a diluent kept at reaction temperature.

The titanium and zirconium dichlorides which are now readily available in the manner described have recently acquired considerable importance in the polymerisation art and are valuable catalysts.

The following examples further illustrate the invention but do not limit same.

*Example 1*

189 parts by weight of titanium tetrachloride, which are dissolved in 87 parts by weight of paraffin oil, are introduced dropwise in about 30 minutes at a temperature of 100° C. and while stirring thoroughly into a dispersion of 46 parts by weight of metallic sodium in 873 parts by weight of paraffin oil, the said dispersion being under pure nitrogen. During the reduction process, the reaction temperature is kept at 97–100° C. by cooling. After the addition of the tetrachloride the cooling is discontinued and the stirrer mechanism is run a few minutes longer until the reaction subsides. In this way, there is obtained a deep black titanium dichloride suspension, which is preferably used directly in its existing finely divided form as a polymerisation catalyst. The amount of titanium dichloride formed is about 95–100 parts by weight. The titanium dichloride obtained in this manner is practically free from metallic titanium.

If it is desired to isolate the titanium dichloride in dry form, it is sufficient for the product to be washed several times in petroleum ether after the paraffin oil has been filtered off with suction, the said ether being removed in vacuo. In this way, there is obtained a greyish-black titanium dichloride which still contains sodium chloride and which can be stored as long as desired without change under pure nitrogen.

*Example 2*

154 parts by weight of finely powdered titanium trichloride are introduced in small portions over a period of 45 minutes and while stirring vigorously into a dispersion prepared from 23 parts by weight of sodium metal and 873 parts by weight of paraffin oil, the temperature being kept in the region of 108–118° C. The result is a deep-black titanium dichloride suspension, which can be used or worked up in the same manner as described in Example 1. The yield of titanium dichloride is about 97 parts by weight.

*Example 3*

58 parts by weight of finely powdered zirconium tetrachloride are introduced at 150–160° C. and over a period of 1½ hours into a dispersion prepared from 12 parts by weight of sodium and 436 parts by weight of paraffin oil, the mixture being stirred vigorously. There is obtained a very finely divided suspension of deep black zirconium dichloride, which can with advantage be directly used as a catalyst suspension, in the same way as can the titanium dichloride suspensions prepared as described in the above examples.

We claim:

1. Process for the production of a finely divided dichloride of a metal of the group consisting of titanium and zirconium, said powder being substantially free of said metals in metallic state and substantially free of higher chlorides of said metals which comprises heating in an inert atmosphere, at a temperature of between 95° and 120° C. when a member of the group consisting of titanium trichloride and titanium tetrachloride is used and at a temperature of between 130° and 160° C. when zirconium tetrachloride is used, a dispersion of a said halide and the stoichiometric amount of sodium metal having a particle size between 5 and 10 microns in an inert liquid, and recovering the resulting suspension of the finely divided dichloride of the group consisting of titanium dichloride and zirconium dichloride.

2. A process as claimed in claim 1, wherein the heating is carried out with the titanium chloride at a temperature of between 95 and 120° C.

3. A process as claimed in claim 1, wherein the heating is carried out with the zirconium chloride at a temperature of between 130 and 160° C.

4. Process for the production of a finely divided dichloride of a metal of the group consisting of titanium and zirconium, said powder being substantially free of said metals in metallic state and substantially free of higher chlorides of said metals which comprises heating in an inert atmosphere, at a temperature of between 95° and 120° C. when a member of the group consisting of titanium trichloride and titanium tetrachloride is used and at a temperature of between 130° and 160° C. when zirconium tetrachloride is used, a dispersion of a said halide and the stoichiometric amount of sodium metal having a particle size between 5 and 10 microns in an inert liquid, to form a suspension of the finely divided chloride of the group consisting of titanium dichloride and zirconium dichloride, and recovering said dichloride from the suspension.

References Cited in the file of this patent

UNITED STATES PATENTS

| | | |
|---|---|---|
| 2,618,550 | Hampel et al. | Nov. 18, 1952 |
| 2,703,752 | Glasser et al. | Mar. 8, 1955 |

OTHER REFERENCES

Handbook of Chemistry and Physics, 14th ed., by Hodgman-Lange, pp. 282–283. Chemical Rubber Pub. Co., Cleveland, Ohio.